United States Patent
Takeuchi et al.

(10) Patent No.: US 6,579,628 B2
(45) Date of Patent: Jun. 17, 2003

(54) MULTI-LAYERED ANTI-COKING HEAT RESISTANT METAL TUBE AND METHOD FOR MANUFACTURE THEREOF

(75) Inventors: Yuko Takeuchi, Nagoya (JP); Yoshihisa Kato, Nagoya (JP); Noriyoshi Yokota, Nagoya (JP); Seiya Asari, Nagoya (JP); Masaki Tsuchiya, Nagoya (JP); Takao Shimizu, Nagoya (JP); Isao Tanaka, Nagoya (JP)

(73) Assignee: Daido Tokushuko Kabushiki Kaisha, Aichi (JP)

(*) Notice: Subject to any disclaimer, the term of this patent is extended or adjusted under 35 U.S.C. 154(b) by 0 days.

(21) Appl. No.: 09/877,085

(22) Filed: Jun. 11, 2001

(65) Prior Publication Data

US 2002/0011467 A1 Jan. 31, 2002

(30) Foreign Application Priority Data

Jun. 12, 2000 (JP) .......................... 2000-175633

(51) Int. Cl.[7] .................. F16L 9/02; C10G 9/16; C10G 9/20; B23K 10/02
(52) U.S. Cl. .................. 428/667; 428/679; 138/142; 138/143; 138/145; 219/76.16
(58) Field of Search ................. 428/685, 683, 428/678, 679, 667, 680; 138/142, 143, 146, 145; 219/76.16, 121.47

(56) References Cited

U.S. PATENT DOCUMENTS

| 3,597,241 A | | 8/1971 | Perugini .................. 106/1 |
| 4,505,232 A | * | 3/1985 | Usami et al. .............. 122/511 |
| 5,103,870 A | * | 4/1992 | Ishii et al. ................ 138/140 |
| 5,190,832 A | * | 3/1993 | Ogawa et al. ............. 138/177 |
| 5,194,222 A | * | 3/1993 | Ogawa et al. ............. 138/177 |
| 5,242,665 A | | 9/1993 | Maeda et al. ............. 422/240 |
| 5,855,699 A | * | 1/1999 | Oyama et al. ............. 148/519 |
| 5,866,068 A | * | 2/1999 | Takahashi ................ 420/428 |
| 6,337,459 B1 | * | 1/2002 | Terwijn et al. .......... 219/121.47 |

FOREIGN PATENT DOCUMENTS

| DE | 195 36 978 A | | 4/1996 |
| EP | 765948 A2 | * | 4/1997 |
| EP | 1 043 084 A2 | | 10/2000 |
| EP | 1 043 084 A | | 11/2000 |
| FR | 1 515 486 A | | 1/1968 |
| JP | 5-93239 | * | 4/1993 |
| JP | 5-93240 | * | 4/1993 |
| JP | 7-113139 | * | 5/1995 |
| JP | 7-258782 | * | 10/1995 |
| JP | 7-258783 | * | 10/1995 |
| JP | 7-266082 | * | 12/1996 |
| JP | 10-156582 | * | 6/1998 |
| JP | 10-160586 | * | 6/1998 |
| JP | 11-285890 | * | 10/1999 |
| JP | 2001-113389 | * | 4/2001 |

\* cited by examiner

Primary Examiner—John J. Zimmerman
(74) Attorney, Agent, or Firm—Bacon & Thomas

(57) ABSTRACT

The multi-layered heat resistant metal tube is disclosed. This tube has excellent anti-coking characteristics and is suitable for use under the conditions where carbon tends to deposit and accumulate thereon due to contacting with hydrocarbons at a high temperature. The tube is made by forming weld-mounted overlaid layer of Cr—Ni alloy by building-up welding over the inner surface and/or the outer surface of a substrate tube made of a heat resistant metal. The Cr—Ni alloy comprises 35% by weight or more of Cr and satisfies the relationship: Ni(w%)≧0.5Cr(wt %). Building-up welding is preferably carried out by PPW (Plasma Powder Welding) in which the filler metal is supplied in the form of powder.

14 Claims, 2 Drawing Sheets

MULTI-LAYERED ANTI-COKING HEAT RESISTANT METAL TUBE AND METHOD FOR MANUFACTURE THEREOF

BACKGROUND OF THE INVENTION

1. Field of the Invention

The present invention relates to a multi-layered heat resistant metal tube having excellent anti-coking characteristics and a method for manufacturing thereof. The multi-layered heat resistant metal tube is suitable for those tubes which are used in a high temperature and in a high carbonization potential environment as components of apparatus.

2. Description of the Related Art

High resistance to coking and carbonization, in addition to heat resistance, is required to some parts such as heat radiant tube of carburization-hardening furnaces, cracking tubes of thermal decomposition furnaces, particularly, ethylene cracking furnace tube or oil refinery cracking tube or all the other petrochemical thermal cracking furnace tube applications. Coking is a phenomenon of deposition and accumulation of carbon generated by thermal decomposition of hydrocarbons onto the surfaces of the metal tubes. This causes trouble of decrease in cross sectional area of furnace tubes, which may finally lead to blocking of the furnace tubes. Carbonization of metal is a carburization phenomenon of intrusion of carbon through the surface of the metal and diffusion of carbon into the inner part of the metal. This may either cause the coking or directly be processed by intrusion of carbon from the atmosphere. In any way, corrosion of the tubes due to decreased corrosion resistance caused by the carburization, decrease in the area of inner diameter of the tubes due to coke deposit, and possible embrittlement subsequently caused is fatal to the furnace tube units.

There exists a single layer solid tube of Cr—Ni base heat resistant alloy in application for the above listed use. A group of the conventionally known materials are composed of 40–50 wt % Cr—Ni alloys disclosed in Unexamined Japanese Patent Publication (kokai) Nos. 05-93240, 07-113139, 07-258782 and 07-258783. The alloys were designed to contain, in order to provide high temperature strength, 0.1–0.5 wt % of C and not more than 0.2 wt % of N, and additionally contain, as the components to enhance the high temperature strength, at least one element of Al, Nb, Ti, Zr or W. Another group is represented by an alloy steel disclosed in Unexamined Japanese Patent Publication (kokai) No. 05-1344. This alloy steel has alloy compositions containing 0.05–0.3 wt % of C and 0.1–0.6 wt % of N with the purpose of providing high temperature strength, not more than 5.0 wt % of Si as the component of giving resistance to carburization, and not more than 0.4 wt % of Mn and 0.001–0.02 wt % of Mg for improvement of the ductility.

These alloy compositions are, on one hand, effective for the purpose of providing high temperature strength and improving ductility, and on the other hand, could be rather harmful in anti-coking and/or anti-carburizing characteristics, and thus, the conventional materials are not satisfactory from these points of view.

Then dual layered cast tube was developed so that base layer might function for high temperature resistance while the surface layer would work for anti-coking or anti-carburizing. "Insert casting" is a typical method for producing the double layered tubes. Unexamined Japanese Patent Publication (kokai) No. 60-170564 discloses a technology to produce bent tubes by using a previously heated insert in a shape of a bent tube and a sand mold as the outer mold and casting molten metal therebetween to obtain a cast product in which the bent tube is inserted. The drawback of this technology is that the surface of the insert which contacts with the molten metal melts and contaminates the molten metal. Further, in case where the cast product is thin, distribution of the molten metal will be insufficient, and defects such as incomplete surface fusion and blow holes often occur.

Another method for producing double layered tubes is centrifugal casting. Unexamined Japanese Patent Publication (kokai) Nos. 05-93238 and 05-93249 propose sequential casting which is composed of the first charging molten metal of high nickel Fe—Ni—Cr heat resistant steel in a centrifugal casting machine to case the other layer, and then charging a molten metal of Cr—Ni alloy to cast and form the inner layer. In order to operate a centrifugal casting machine with high productivity, however, it is forced to charge the molten metal for inner layer before complete solidification of the outer layer. It has been known that, as far as coking is concerned, Fe acts as a catalyst for coke depositing, and therefore, is harmful. In case of combining the above alloy compositions, it is inevitable that Fe contained in the outer tube material diffuses into the inner layer material to reach the surface of the inner layer, and thus, it is not possible to produce multi-layered tube having excellent anti-coking characteristics. On the other hand, casting the inner layer after solidification of the outer layer results in cracking due to thermal expansion-contraction during solidification, and thus, it is quite difficult to produce desired tubes with practical yield.

Possible further way of producing double layered tubes is hot extrusion to form cladded tubes. Unexamined Japanese Patent Publication (kokai) No. 07-150556 proposes tube forming by hot rolling of a blank prepared by inserting a hollow billet of alloy having a suitable alloy composition into a hollow billet of a Ni—Fe—Cr heat resistant alloy. At present, however, the costs for production is so high that this kind of cladded tubes have not practical use in this field.

"Inchromizing" method is a technology to form a high chromium layer on the surface of a heat resistant metal tube. Thickness of the chromium rich layer formed by this technology is, however, 30 $\mu$m to 50 $\mu$m at highest, and thus, there is limitation in application to the parts of apparatus from which surface layer as a consumable will be lost by oxidation or carbonization.

Ethylene cracking reactor furnace (or ETHYLENE TUBE) produces ethylene by cracking naphtha at the toughest conditions where high temperature heat resisting and anti-coking material were critically demanded. Naphtha, as the feed steam mixture, passes through the ETHYLENE TUBE of the radiant section where thermal cracking takes place. The heat of conversion is provided by burners on the side wall or in the bottom of the radiant section, called fire box. During the very short residence time in the radiant coil (tenth of a second) at around 1000° C., the hydrocarbons including naphtha are cracked to ethylene, butadiene, butanes and aromatics. Since the tube material temperature in the fire box can often exceed 1100° C. (2021° F.), centrifugal cast high temperature, creep resistant alloys such as HK-40, HP-40 or HP Mod. are in use. While these conventional materials are good for creep rapture at 1100° C., precipitation and depositing of carbon and/or embrittlement of ETHYLENE TUBE accompanied with carbonization are inevitable. Built-up carbon coke needs a cyclical removal of coke which is accompanied with interrupting the operation (anti-coking). Embrittlement by carbonizing in a serious case needs replacement of the whole tube unit. Because of gas stream inside the tube being of hydrocarbon at high temperature the gas atmosphere will be origin for building carbon deposition on the surface of the tube metal. This will reduce run-length and also leads to subsequent diffusion into the tube material. The diffusion process or carbonization will cause many detrimental effects in the physical properties of the tube. The ductility, toughness, rupture time and melting will deduce the original grade progressively as the carbonization process goes on. This can eventually lead to prematured failure of the tubes by a set of attacks of thermal shock, stress rupture, thermal fatigue, or carbonization-induced cracking. In fact carbonization is the major cause of ethylene furnace failure in industry wide.

At the 11$^{th}$ Conference of Ethylene Makers held in Houston in March of 1999 there was a presentation for improvement of the ethylene tubes to give double layer coating of a Cr—Si alloy and Si—Al alloy on the substrate tube made of heat resistant alloy. This technology is effective to improve anti-coking characteristics. However, the coating needs huge investment for a metal powder, a ceramic powder and a polymer, and further, requires complicated steps to carry out the coating, i.e., a chemical treatment step for adhesion to form three layers which are an adhesion layer, diffusion layer and hard non-reactive layer, and inactivation of the surface layer. Thus, costs for preparing the double coated ethylene tubes are very high.

SUMMARY OF THE INVENTION

An object of the present invention is to provide a heat resistant metal tube which can be used under the conditions where carbon deposit and carburization easily occur at a high temperature, typically, in ethylene tubes of naphtha crackers, with improved performance of excellent anti-coking characteristics and anti-carburizing characteristics in the form of a multi-layered metal tube.

The multi-layered heat resistant metal tube having excellent anti-coking characteristics according to the present invention is made by forming a weld-mounted overlaid layer of a Cr—Ni alloy by building-up welding layer on the inner surface and/or the outer surface of a substrate tube of heat resistant metal. In the tube, the alloy of the weld-mounted layer overlaid by building-up welding comprises 35% by weight or more of Cr and satisfies the relationship: Ni(w%)≧0.5Cr(wt %).

BRIEF DESCRIPTION OF THE INVENTION

Figure 1:
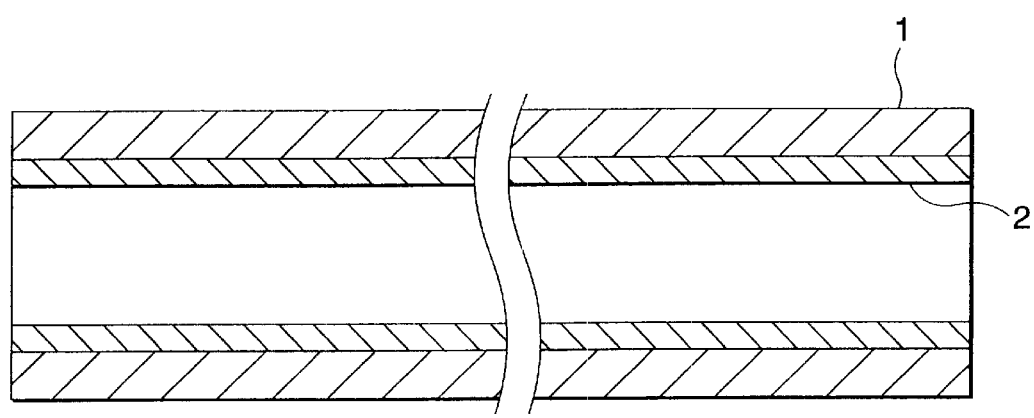
FIG. 1 is a longitudinal cross-section view of an example of the multi-layered heat resistant metal tube according to the present invention.
Figure 2:
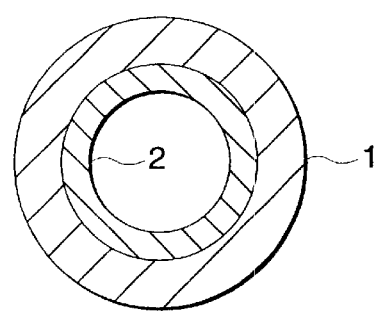
FIG. 2 is a cross-section of the multi-layered heat resistant metal tube shown in FIG. 1.

In FIGS. 1 and 2, 1: Substrate material of heat resistant metal, and 2: Weld-mounted overlaid layer

DETAILED DESCRIPTION OF THE INVENTION

Detailed description of the present invention will be described as follows.

The multi-layered heat resistant metal tube having excellent anti-coking characteristics according to the present invention is, as shown in FIGS. 1 and 2, made by forming a weld-mounted overlaid layer of a Cr—Ni alloy (2) by building-up welding layer on the inner surface and/or the outer surface (in the illustrated example, inner surface only) of a substrate tube (1) of heat resistant metal.

Thus, the present invention provides:

(1) a multi-layered heat resistant metal tube having excellent anti-coking characteristics, characterized in that a weld-mounted overlaid layer made of a Cr—Ni alloy containing 35% by weight or more of Cr and satisfies the relationship: Ni(w%)≧0.5Cr(wt %) is formed on at least one of the inner surface and the outer surface of a substrate tube material by building-up welding method.

(2) The multi-layered heat resistant metal tube according to (1) above, wherein the total content of components other than Cr and Ni in the Cr—Ni alloy is restricted to be 20% by weight or less based on the total weight of the Cr—Ni alloy.

(3) The multi-layered heat resistant metal tube according to (2) above, wherein the amount of Fe as one of the components other than Cr and Ni in the Cr—Ni alloy is restricted to be not more than 10% by weight based on the total weight of the Cr—Ni alloy.

(4) The multi-layered heat resistant metal tube according to (1) above, wherein the total content of components other than Cr and Ni of the Cr—Ni alloy is restricted to be 10% by weight or less based on the total weight of the Cr—Ni alloy.

(5) The multi-layered heat resistant metal tube according to (4) above, wherein the amount of Fe as one of the components other than Cr and Ni in the Cr—Ni alloy is restricted to be not more than 5% by weight based on the total weight of the Cr—Ni alloy.

(6) The multi-layered heat resistant metal tube according to (1) above, wherein the total content of components other than Cr and Ni of the Cr—Ni alloy is restricted to be 5% by weight or less based on the total weight of the Cr—Ni alloy.

(7) The multi-layered heat resistant metal tube according to (6) above, wherein the amount of Fe as one of the components other than Cr and Ni in the Cr—Ni alloy is restricted to be not more than 1% by weight based on the total weight of the Cr—Ni alloy.

(8) The multi-layered heat resistant metal tube according to any one of (1) to (7) above, wherein a part of Ni is replaced with Co and said Cr—Ni alloy satisfies the relationship:

$$Ni(wt\%)+Co(wt\%) \geq 0.5Cr(wt\%).$$

(9) The multi-layered heat resistant metal tube according to any one of (1) to (8) above, wherein said substrate tube material is one member selected from the group consisting of an iron-based alloy having a Cr content of 8% by weight or higher, heat-resistant cast steel, HK steel, HP steel, and HP-modified steel.

(10) The multi-layered heat resistant metal tube according to any one of (1) to (9) above, wherein said building-up welding is performed by Plasma Powder Welding (PPW)

(11) The multi-layered heat resistant metal tube according to any one of (1) to (10) above, wherein a thickness of said weld-mounted overlaid layer is at least 0.5 mm.

(12) The multi-layered heat resistant metal tube according to any one of (1) to (7) above, wherein a surface of said weld-mounted overlaid layer has $R_{max}$, a maximum roughness, of 12 µm or less by polishing.

(13) A method for manufacturing a multi-layered heat resistant metal tube having excellent anti-coking characteristics, characterized in that a powder of Cr—Ni alloy or a powder of metals or alloy, which is capable of providing a metal composition of the overlaid layer as defined in any one of (1) to (9) above, is subjected to plasma powder welding to form the overlaid layer on at least one of the inner surface and the outer surface of the substrate tube material.

(14) The method according to (13) above, which further comprises a step of polishing the surface of the weld-mounted overlaid layer to have a maximum surface roughness $R_{max}$ of 12 µm or smaller.

The heat resistant metal which forms the tube substrate may be chosen from various alloys classified in heat resistant steels or heat resistant alloys, depending on the degree of heat resistance required to produce multi-layered heat resistant metal tubes. The following are examples of the practical heat resistant metals.

(1) Iron-based alloy containing not less than 8 wt % of Cr (based on the total weight of the alloy). Typical steel grades are SUS403, SUS410, SUS304, SUS316, SUH3 and SUH4 in JIS classification.

(2) Heat resistant cast steel. Typically SCH15 and SCH16.

(3) HK-steels, particularly, HK-40 (25Cr-2ONi-0.4C (Fe base))

(4) HP-steels, particularly, HP-40 (25Cr-35Ni-0.4C (Fe base))

(5) HP-modified steel (25Cr-35Ni-0.4C—Nb/W (Fe base))

The Cr—Ni alloy which forms the weld-mounted overlaid layer comprises 35 wt % or more of Cr and satisfies the relationship: Ni(wt %)≧0.5Cr(wt %). The reason for restricting on the alloy composition and preferred ranges for the alloy composition are as follows.

Cr: 35 wt % or more, preferably 40 wt % or more based on the total weight of the Cr—Ni alloy Chromium is an important element necessary for increasing anti-oxidizing characteristics, and for achieving anti-coking characteristics aimed at in the present invention. To obtain these effects sufficiently not less than 35 wt % of Cr is necessary, preferably not less than 40 wt %.

Ni: Ni(wt %)≧0.5Cr(wt %), preferably Ni(wt %)=1.0Cr(wt %) to 1.4Cr(wt %)

Nickel forms austenite in cooperation with Cr. In order to keep the structure of the tube stable in such a high temperature as the practical ethylene tubes are used and to achieve the intended anti-carburizing characteristics and anti-coking characteristics, the Ni content should be equal to or greater than 0.5Cr(wt %). The preferred Ni content range is from 1.0Cr(wt %) to 1.4Cr(wt %).

The portion of Ni can be replaced by Co. Such replace makes no differences in effect of Ni, further more brings about some improvements in anti-coking characteristics. However, Co is more expensive than Ni while the merits of replacing is not so high as the difference of prices, and it is not advisable to use a large amount of Co. Usually, replacing 10 wt % of Ni will be recommendable and, at highest, maximum not more than 50 wt % of Ni is advisable.

In order to ensure the high level anti-coking characteristics aimed by the invention, it is preferable to restrict the maximum amounts of some components (except Cr and Ni) contained in the weld-mounted overlaid alloy layer to keep the aimed quality. Such other components including impurities are herein called "the third components". Examples of the third components and the maximum contents thereof are as follows.

Fe: not more than 10 wt %, preferably not more than 5 wt %, more preferably not more than 1 wt %, based on the total weight of the Cr—Ni alloy Because Fe is a component which works for catalyst for coking, it is advisable to control its amount as low as possible. Otherwise, the structure of multi-layer in this invention will be of detriment and loose the spirit of the invention. In a case where the product is used in relatively less severe conditions, Fe-content is permissible by not more than 10 wt %, and in other cases it must be controlled not more than 5 wt %. In a case where the product is used particularly severe conditions, it must be controlled not more than 1 wt %. Without any special case in making Cr—Ni alloy weld-mounted layer in selected of materials and without lowering the Fe diffused from the substrate tube, harmful enough level of Fe possibly comes into the product. The permissible amount of Fe as the impurity should be controlled from the balance of the quality of the product and cost economy.

Mo: not more than 5 wt % (preferably not more than 0.5 wt %) based on the Cr—Ni alloy, based on the total weight of the Cr—Ni alloy Mo serves to improve weldability of metal to be weld-mounted, but there is no need to externally add Mo provided that welding is carried out at a low rate and with the welding arc sufficiently shielded with gas. The Mo content, if added, should be 5 wt % at the most. Too much addition of Mo results in fading of high temperature strength and ductility. It is preferable to control the Mo amount to be not more than 0.5 wt % when high toughness and ductility are particularly required.

C: Not more than 0.1 wt %, preferably not more than 0.03 wt %, based on the total weight of the Cr—Ni alloy Usually, heat resistant steel requires a certain amount of C for the purpose of obtaining tensile strength and creep rupture strength. C is, however, harmful from the view point of corrosion resistance and anti-coking characteristics. In the multi-layered heat resistant weld-mounted metal tube of he invention, the strength is mainly born by the substrate tube, and therefore, it is not necessarily highly demanded that the overlaid metal should have high strength. Thus, C-content in the Cr—Ni alloy should be as low as possible. Not more than 0.1 wt % of C is permissible, and preferably, not more than 0.03 wt %.

Si: Not more than 1.5 wt %, preferably not more than 1.0 wt %, based on the total weight of the Cr—Ni alloy Si is a vital component for metallurgy, because it is added as a deoxydizer during infusion of alloys at refinery stage. However, Si lowers toughness and ductility, and the lower content thereof, the preferable. Permissible maximum limit is 1.5 wt %. A content less than 1.0 wt % is preferable.

Mn: Not more than 1.5 wt %, preferably not more than 1.0 wt %, based on the total weight of the Cr—Ni alloy Mn is also a dexodizing agent and often naturally is contained in alloys. To maintain the anti-coking characteristics in a high level of the content of Mn should be controlled as small as possible. As a permissible limit 1.5 wt % is set up. However, a content of 1.0 wt % or lower is preferable.

Nb: Not more than 3 wt % based on the total weight of the Cr—Ni alloy

Nb, while effective in increasing creep resistance, tends to impair anti-coking characteristics if added excessively. A preferred Nb content, if added, is 3 wt % or lower.

B, Zr, REM:

B, Zr, and REMs are effective in improving weldability and can be added in such amounts that do not adversely affect the anti-coking characteristics and anti-carburizing characteristics. A preferred content of B, Zr or REMs is 0.015 wt % or lower, 0.015 wt % or lower, or 0.002 wt % or lower, respectively.

In a preferred embodiment of the present invention, the total content of the third components (the above-enumerated components and other impurities) is limited to 20 wt % at the most, with the content to the individual third components falling within the above-specified respective ranges. In a still preferred embodiment, that total content is limited to 10 wt % or lower. It is particularly preferred that the total content of the third components be 5 wt % or lower.

As is well known in the industry the deposited metal mounted by welding has an alloy composition made of blend of the filler metal and the base metal due to fusion of the latter and diffusion into the former. Also, low boiling point components in the filler metal may evaporate during welding, and as the result, chemical contents thereof in the weld-mounted metal layer become low. As the components used in the alloy, boron is volatile, and in regard to REM, the yield must be considered. In the implementation of the invention the chemical composition of the filler metal should be designed by taking these facts in full consideration.

Thickness of the weld-mounted built-up layer must be not less than 0.5 mm. In the built-up welding Fe and some other unfavorable components intrude from the base metal of a heat resistant metal tube, into the built-up layer. The thickness of the layer of not less than 0.5 mm will substantially prevent the surface of the built-up layer from intrusion of such unfavorable components. For the purpose of above-mentioned ethylene tubes application, 1.5 to 2.0 mm o flayer thickness will be sufficient. Thickness of 5 mm of thicker is usually not necessarily of industrial use.

It has been found that, for the coking, in addition to the metallurgical components of the tube, surface smoothness is an important factor. It is desirable that, for the purpose of avoiding coking, the surface of the tube which contacts hydrocarbon should be smooth enough. It is recommended from this point of view to polish the surface to smooth the tube surface from the build-up layer. From design policy of polishing, the maximum roughness is not more than 12 $\mu$m in $R_{max}$.

The weld-mounted layer formation of the invention as the method for producing the multi-layered heat resistant metal tubes is a technology to produce a complex material by heating up filler material by means of arc, laser beam of electron beam as the energy source to melt the filler over the substrate surface so as to form a complex material in which a metal layer of a certain composition is weld-mounted to cover totally or partially the base metal as a combination of a different chemical composition materials. As the methods for combining two metallurgical different materials there exists various technologies other than the weld-mounted layer in the invention, such as HIP, CIP, explosion cladding, diffusion cladding and pressure welding. These technologies are, from the view point of economy of equipment and productivity, less economical, and therefore, not practical compared with the invention. The weld-mounted layer method has been practiced, because the technology can be carried out by using a relatively small scale equipment for general purpose, and quality of the products can be achieved with ease.

Among the weld mounted layer making technologies, one method as the most suitable for the present invention is plasma transfer art welding, particularly, the method which uses filler metals in powder from. This technology is often called "PPW" (an abbreviation of "Plasma Powder Welding"), and hereinafter this abbreviation is used. In the other methods of welding such as gas-shielded arc, TIG or MIG which utilizes heat power generated by arc between an electrode and a substrate, over the surface layer of the substrate in a condition of fully melt molten metal of the substrate mixed with the molten metal of the filler, and the mixing results in full amalgamation of the filler metal with the base metal. Percentage of the dilution will be 10–30%. In case a normal pure weld-mounted layer without dilution demanded, a double or triple mounted layers must be recommended.

On the contrarily to this, because the plasma transfer arc welding does not generates arc between a torch and the substrate but used plasma arc pillar generated at the torch, although high temperature hot plasma is used as the heat source, there needs no deep depth melting of the substrate surface by high power and focused melting. Therefore, the contamination of the filler metal by the base metal can be substantially avoided for practical use throughout the completion of the welding. This means that the difference in composition of the filler metal and the deposited metal is strictly controlled to small, and the intended alloy design of composition in the deposited metal can easily be achieved. Plasma transfer arc welding enables erasing the impurities of the substrate surface by welting off, and further, inert gas used protects the molten pool and its neighborhood by preventing contamination of the molten metals from the environmental air and producing the defects such as blow holes.

Particularly, in PPW, because of powder metal as the filler metal used, it is not necessary to prepare the filler metal in the form of wires or rods, this facilitates the use of hardly processable materials. Thus, the method of producing a metal tube having excellent anti-coking characteristics according to the present invention is characterized by the steps of Plasma Powder Welding to form an weld-mounted overlaid layer, both on the inner surface and/or outer surface of a substrate tube made of a heat resistant metal, of the Cr—Ni alloy which are composed of the chemical composition described above. The designated chemical composition can be materialized not only by infusing each powder of the alloy to make final composition at site, but also by using a powder premixtured the component metals or alloys which will give the final Cr—Ni alloy composition.

A preferred solution for producing the multi-layered heat resistant metal tube which the excellent anti-coking characteristics in the invention was identified that it should have the smooth surface to be obtained over the weld-mounted layer to such extent that the maximum roughness, $R_{max}$, could be 12 $\mu$m or less by machining or polishing, in addition to the above-mentioned strict tuning of chemistry.

The present invention will now be illustrated in greater detail with reference to Examples.

EXAMPLE 1

Effect of Weld-Mounted Overlaid Layer Composition on Anti-coking characteristics:

Cr—Ni alloys having different compositions to give the final compositions shown in Table 1 below when weld-mounted were prepared by melting (Run Nos. 1 to 20 are Examples of the present invention and A, B, C and D are Comparative Examples). Each of the molten compositions was atomized by gas atomization and gas cooling method, and the produced powders were classified by sieving. The powder in the range of 60 or higher to 250 or lower mesh were collected for use. The alloy of Control A has the same alloy compositions as that of conventional HP modified steel.

The desired alloy powder may also be obtained by blending powders of necessary metals. However, the melting method as described above is advantageous for preparing an alloy composition with reduced impurities such as oxygen.

m/second. The test run was carried out for 100 hours. The passing speed of hydrocarbon and exposing time of Cr—Ni tube in hydrocarbon gas in the furnace was accelerated nearly 300 times of toughness in coke depositing condition compared with the real production site (0.5 m/sec vs. 150 m/sec in speed, and 14 mm ID tube vs. 3.5 to 4" ID tube in exposing hydrocarbon density per square mm on the internal surface wall), which is a considerably severe accelerated

TABLE 1

Chemical Composition of Weld-mounted Alloy (unit: wt %)

| Run No. | Cr | Ni | Co | (Ni + Co)/Cr | Fe | Mo | C | Si | Mn | Nb | B, Zr & REM | Others | Total |
|---|---|---|---|---|---|---|---|---|---|---|---|---|---|
| 1 | 35.8 | 62.0 | — | 1.73 | 0.9 | — | 0.02 | 0.4 | 0.5 | — | — | 0.4 | 2.2 |
| 2 | 39.3 | 57.5 | — | 1.46 | 0.8 | 0.5 | 0.03 | 0.5 | 0.9 | — | — | 0.5 | 3.2 |
| 3 | 44.2 | 53.5 | — | 1.21 | 0.5 | — | 0.02 | 0.4 | 0.6 | 0.3 | — | 0.5 | 2.3 |
| 4 | 45.0 | 42.5 | 10.2 | 1.17 | 0.8 | — | 0.03 | 0.4 | 0.5 | — | B: 0.003 | 0.6 | 2.3 |
| 5 | 60.2 | 35.8 | — | 0.59 | 0.6 | 1.1 | 0.05 | 0.6 | 0.7 | 0.6 | — | 0.4 | 4.1 |
| 6 | 64.1 | 33.2 | — | 0.52 | 0.8 | — | 0.05 | 0.6 | 0.7 | — | — | 0.6 | 2.8 |
| 7 | 36.1 | 59.5 | — | 1.65 | 1.6 | 0.7 | 0.06 | 0.5 | 1.0 | — | Zr: 0.002 | 0.5 | 4.4 |
| 8 | 38.2 | 55.9 | — | 1.46 | 2.0 | — | 0.02 | 1.2 | 0.8 | 1.5 | — | 0.4 | 5.9 |
| 9 | 43.8 | 51.2 | — | 1.17 | 2.3 | 0.2 | 0.03 | 1.4 | 0.6 | — | — | 0.5 | 5.0 |
| 10 | 42.5 | 39.2 | 12.5 | 1.22 | 3.8 | — | 0.09 | 0.9 | 0.5 | — | — | 0.5 | 5.8 |
| 11 | 59.2 | 34.3 | — | 0.58 | 4.0 | — | 0.01 | 0.5 | 0.7 | 0.9 | REM: 0.001 | 0.4 | 6.5 |
| 12 | 62.0 | 31.9 | — | 0.51 | 4.5 | 0.1 | 0.04 | 0.5 | 0.6 | — | — | 0.4 | 6.1 |
| 13 | 35.2 | 56.6 | — | 1.61 | 6.3 | — | 0.02 | 0.4 | 1.2 | — | — | 0.3 | 8.2 |
| 14 | 38.0 | 54.0 | — | 1.42 | 7.0 | — | 0.02 | 0.3 | 0.3 | — | — | 0.4 | 8.0 |
| 15 | 42.3 | 46.8 | — | 1.11 | 7.5 | — | 0.03 | 0.4 | 0.5 | 2.0 | — | 0.5 | 10.9 |
| 16 | 47.1 | 38.4 | — | 0.82 | 8.8 | 4.1 | 0.09 | 0.3 | 0.7 | — | B: 0.007 | 0.5 | 14.5 |
| 17 | 48.2 | 40.5 | — | 0.84 | 9.1 | 0.7 | 0.08 | 0.3 | 0.7 | — | — | 0.4 | 11.3 |
| 18 | 50.2 | 38.4 | — | 0.76 | 9.6 | — | 0.03 | 0.9 | 0.4 | — | — | 0.5 | 11.4 |
| 19 | 36.5 | 49.1 | — | 1.35 | 12.2 | — | 0.08 | 0.5 | 1.1 | — | — | 0.5 | 14.4 |
| 20 | 42.2 | 39.4 | — | 0.93 | 13.5 | 3.5 | 0.07 | 0.4 | 0.6 | — | Zr: 0.005 | 0.3 | 18.4 |
| A | 25.1 | 35.2 | — | 1.40 | 37.0 | — | 0.41 | 1.3 | 0.6 | — | — | 0.4 | 39.7 |
| B | 34.0 | 45.9 | — | 1.35 | 15.4 | 2.1 | 0.09 | 0.8 | 1.2 | — | B: 0.005 | 0.5 | 20.1 |
| C | 55.1 | 27.1 | — | 0.49 | 12.2 | 3.0 | 0.09 | 1.0 | 1.1 | — | — | 0.4 | 17.8 |
| D | 61.8 | 22.3 | — | 0.36 | 13.3 | 1.0 | 0.02 | 0.4 | 0.6 | — | — | 0.6 | 15.9 |

The above alloy powders for the layer were welded by PPW method over the outer surfaces of SUS347 pipes having outer diameter of 10 mm, inner diameter of 4 mm and length 1.5 m to form overlaid layers of 5 mm thick in full. Then, by boring holes of diameter 14 mm at the centers of the welded pipes with a center-boring machine (BTA9), the SUS437 pipes used as the substrates and parts of the weld-mounted layers just outside the substrates were removed in full length. Thus, such pipes consisting of single layer of the weld-mounted metal with outer diameter 20 mm, inner diameter 14 mm and length 1.5 m were obtained. The alloy compositions of the weld-mounted metals are as shown in Table 1.

Inner surface of the above pipes of the overlaid metal in single layer were polished to make $R_{max}$, the maximum roughness, 3 µm or less. With respect to the pipe consisting of the weld-mounted alloy layer having the composition of Run No. 3 in Table 1 the degree of polishing the inner surfaces was adjusted to be the following four grades: the first one has $R_{max}$ of around 3 µm the second one, very smooth surface of $R_{max}$ less than 2 µm the third one, relatively rough surface of $R_{max}$ around 7 µm, and the forth one, rough surface of $R_{max}$ 12 µm.

Sample pieces, designed and welded in the way of the above description, were put in a testing furnace for simulating ethylene production condition. In furnace the tube was heated up to 1100° C. In the tube, vaporized naphtha with steam normally passed through the tube at speed of 0.5 testing for coking in view of the long staying of hydrocarbon and less effect of blowing off the coke deposit.

Gas pressure was measured for identifying the degree of blockage of the tube by coke deposit as the following equation.

$$GP = (GP \text{ at ending of the test} - GP \text{ at beginning})/(GP \text{ at beginning}) \times 100\ (\%)$$

GP: Gas Pressure

Figure 3:
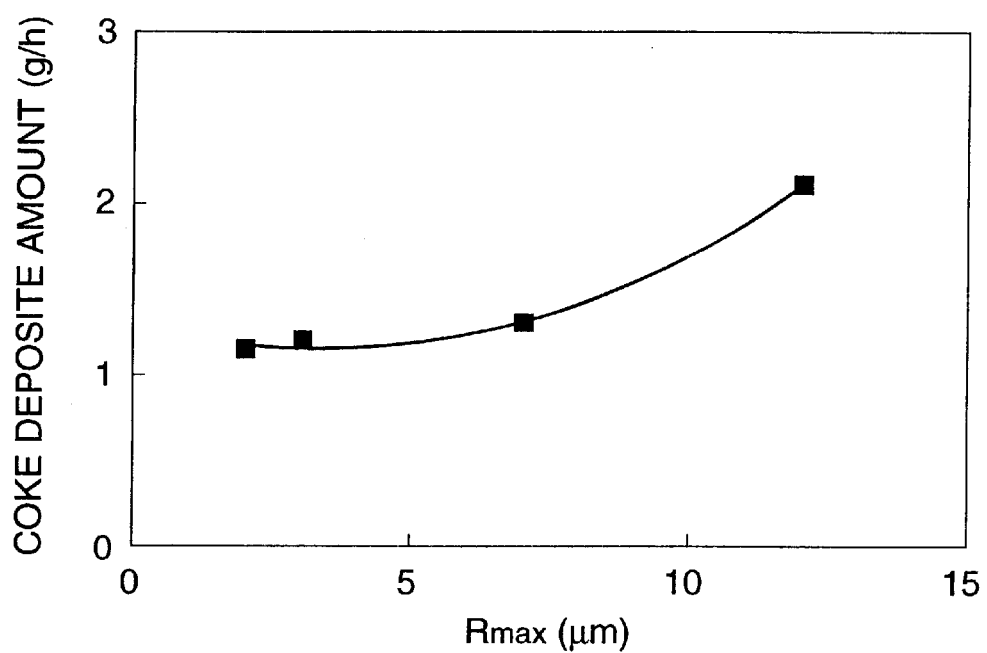
FIG. 3 is a graph showing the effect of surface smoothness of weld-mounted overlaid layer in regard to anti-coking characteristics in Example described below.

The testing tubes were chilled and measured the weight of the coke deposit. Gross weight minus the tube metal weight was estimated as the coke deposit weight. The percentage pressure change and the rate of coke deposition thus obtained are shown in Table 2. The rates of coke deposition of the four samples of Run No. 3 were plotted against inner surface smoothness ($R_{max}$) in FIG. 3.

Then, PPW weld-mounted tube was put into carburization furnace and heated up to 1100° C. in the atmosphere of carburizing accelerated by Degussa KG13 and was kept for 200 hours there. After that the sample pieces were pulled our for measurement of the depth of the carburized area ("the carburized area" was identified so when the carbon content increased by more than 2 wt %). The results are shown in Table 2 below.

TABLE 2

Anti-coking and Anti-carburizing Characteristics

| Run No. | Anti-coking Characteristics | | | Carburizing Depth (mm) |
|---|---|---|---|---|
| | Pressure Change (%) | Coke Deposition Rate (g/hr) | Evaluation | |
| 1 | 4 | 1.9 | good | 0.4 |
| 2 | 3 | 1.7 | good | 0.3 |
| 3 | 1 | 1.2 | excellent | 0.1 |
| 4 | 1 | 1.1 | excellent | 0.1 |
| 5 | 2 | 1.3 | excellent | 0.2 |
| 6 | 3 | 1.4 | excellent | 0.2 |
| 7 | 4 | 2.0 | good | 0.3 |
| 8 | 4 | 1.9 | good | 0.3 |
| 9 | 3 | 1.6 | good | 0.2 |
| 10 | 3 | 1.5 | excellent | 0.2 |
| 11 | 3 | 1.7 | good | 0.2 |
| 12 | 4 | 1.9 | good | 0.1 |
| 13 | 4 | 2.1 | fair | 0.4 |
| 14 | 4 | 2.0 | good | 0.3 |
| 15 | 3 | 1.6 | good | 0.2 |
| 16 | 3 | 1.7 | good | 0.2 |
| 17 | 4 | 2.0 | good | 0.2 |
| 18 | 4 | 2.1 | fair | 0.1 |
| 19 | 5 | 2.5 | fair | 0.4 |
| 20 | 5 | 2.3 | fair | 0.3 |
| A | 19 | 3.5 | poor | 3.5 |
| B | 12 | 3.3 | poor | 3.3 |
| C | 11 | 3.1 | poor | 1.5 |
| D | 11 | 3.1 | poor | 2.1 |

EXAMPLE 2
Practical Use in Naphtha Cracker

Among the Cr—Ni alloys subjected to the tests for anti-coking and anti-carburizing characteristics in Example 1, three alloy powders of Run Nos. 3, 7, 10, 15 and 20 were picked up for application for practical ethylene tubes of a naphtha cracker.

For the heat resistant metal tube substrate HP-modified steel (alloy composition: 0.4C-1.2Si-34.9Ni-25.0Cr-1.2Nb (Fe base)), with an outer diameter of 95 mm, thickness of 9 mm (accordingly, inner diameter is 77 mm) and length 2 m were used, as conventionally used for the material of ethylene tubes. The above alloys were overlaid by built-up welding. the inner surfaces of the tubes were polished to decrease the surface roughness to $R_{max}$ of 3 μm or less.

These ethylene tubes were installed in a naphtha cracker and used. After 60 days continuous operation of cracking, the tubes were taken out from the cracker and amount of carbon deposit were measured to verify anti-coking characteristics. The results are shown in Table 3 below.

TABLE 3

| Alloy composition (Run No. in Example 1) | Coke Deposit |
|---|---|
| 3 | 842 |
| 7 | 1403 |
| 10 | 1053 |
| 15 | 1264 |
| 20 | 2230 |
| HP-modified steel | 5052 |

The multi-layered heat resistant metal tube according to the present invention exhibits excellent anti-coking characteristics attributed to the Cr—Ni alloy layer which is weld-mounted on the substrate tube while owing its high temperature creep resistance to the substrate tube which is made of a heat-resistant metal. Therefore, even when used continuously and for a long period of time in a high temperature reaching 1100° C. and in an environment which easily invites coking or carburization, coke deposition on the surface is suppressed, and the degree of carburization is negligible. Where the build-up welding is performed by plasma transfer arc welding, especially plasma powder layer as thin as 0.5 mm suffices to provide a sufficient anti-coking life. Since the multi-layered heat resistant metal tube of the invention is hardly susceptible to coking, the tube is prevented, in principle, from such carburization as is attributed to coking on the tube surface in a high carbon potential environment. Carburization which proceeds through intrusion of carbon directly from the atmosphere is also suppressed compared with conventional tubes. As a result, the metal tube of the invention is protected against reduction in anticorrosion due to carburization and resultant embrittlement.

In applying the present invention to an ethylene tube, the preferred embodiment consisting of polishing the surface of the weld-mounted overlaid layer further ensures the reduction of coking.

The build-up welding technique adopted for producing the multi-layered metal tube of the invention, particularly plasma powder welding can be conducted through a simple process without requiring large-sized or special equipment, which leads to cost reduction.

While the invention has been described in detail and with reference to specific embodiments thereof, it will be apparent to one skilled in the art that various changes and modifications can be made therein without departing from the spirit and scope thereof.

What is claimed is:

1. A multi-layered heat resistant metal tube having excellent anti-coking characteristics, comprising:

a substrate tube material comprising a heat resistant metal; and a weld-mounted overlaid layer comprising a Cr—Ni alloy which is building-up welded by plasma powder welding over at least one of the inner surface and the outer surface of said substrate tube material, wherein said Cr—Ni alloy comprises 50.2% by weight or more of Cr and satisfies the relationship: Ni (wt %)≧0.5Cr(wt %).

2. The multi-layered heat resistant metal tube according to claim 1, wherein the total content of components other than Cr and Ni in the Cr—Ni alloy is 20% by weight or less based on the total weight of the Cr—Ni alloy.

3. The multi-layered heat resistant metal tube according to claim 2, wherein the amount of Fe as one of the components other than Cr and Ni in the Cr—Ni alloy is not more than 10% by weight based on the total weight of the Cr—Ni alloy.

4. The multi-layered heat resistant metal tube according to claim 1, wherein the total content of components other than Cr and Ni of the Cr—Ni alloy is 10% by weight or less based on the total weight of the Cr—Ni alloy.

5. The multi-layered heat resistant metal tube according to claim 4, wherein the amount of Fe as one of the components other than Cr and Ni in the Cr—Ni alloy is not more than 5% by weight based on the total weight of the Cr—Ni alloy.

6. The multi-layered heat resistant metal tube according to claim 1, wherein the total content of components other than Cr and Ni of the Cr—Ni alloy is 5% by weight or less based on the total weight of the Cr—Ni alloy.

7. The multi-layered heat resistant metal tube according to claim 6, wherein the amount of Fe as one of the components other than Cr and Ni in the Cr—Ni alloy is not more than 1% by weight based on the total weight of the Cr—Ni alloy.

8. The multi-layered heat resistant metal tube according to claim 1, wherein a part of Ni is replaced with Co and said Cr—Ni alloy satisfies the relationship: Ni(wt %)+Co(wt %)≧0.5Cr(wt %).

9. The multi-layered heat resistant metal tube according to claim 1, wherein said substrate tube material comprises one member selected from the group consisting of an iron-based alloy having a Cr content of 8% by weight or higher, heat-resistant cast steel, HK steel, HP steel, and HP-modified steel.

10. The multi-layered heat resistant metal tube according to claim 1, wherein a thickness of said weld-mounted overlaid layer is at least 0.5 mm.

11. The multi-layered heat resistant metal tube according to claim 1, wherein a surface of said weld-mounted overlaid layer has $R_{max}$, a maximum roughness, of 12 m or less by polishing.

12. A method for manufacturing a multi-layered heat resistant metal tube having excellent anti-coking characteristics, which comprises the steps of:
    subjecting a powder of Cr—Ni alloy or a powder of metals or alloy, which is capable of providing a metal composition of the overlaid layer as defined in claim 1, to plasma powder welding to form the overlaid layer on at least one of the inner surface and the outer surface of the substrate tube material.

13. The method according to claim 12, which further comprises a step of polishing the surface of the weld-mounted overlaid layer to have a maximum surface roughness $R_{max}$ of 12 μm or smaller.

14. A multi-layered heat resistant metal tube having excellent anti-coking characteristics according to claim 1, wherein said Cr—Ni alloy comprises 59.2% by weight or more of Cr and satisfies the relationship: Ni (wt %)≧0.5Cr (wt %).

* * * * *